United States Patent
Vu et al.

(10) Patent No.: US 10,190,684 B2
(45) Date of Patent: Jan. 29, 2019

(54) METHOD AND APPARATUS TO CONTROL A CONTINUOUSLY VARIABLE TRANSMISSION

(71) Applicant: GM GLOBAL TECHNOLOGY OPERATIONS LLC, Detroit, MI (US)

(72) Inventors: David H. Vu, East Lansing, MI (US); Christopher Jay Weingartz, Holly, MI (US); Craig J. Hawkins, Howell, MI (US); Pratap A. Naick, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 517 days.

(21) Appl. No.: 14/944,459

(22) Filed: Nov. 18, 2015

(65) Prior Publication Data

US 2017/0138471 A1 May 18, 2017

(51) Int. Cl.
  *F16H 9/18* (2006.01)
  *F16H 61/662* (2006.01)
  *F16H 61/66* (2006.01)

(52) U.S. Cl.
  CPC .......... *F16H 61/662* (2013.01); *F16H 9/18* (2013.01); *F16H 61/66254* (2013.01); *F16H 2061/6615* (2013.01)

(58) Field of Classification Search
  CPC ............... F16H 2061/6615; F16H 2061/6611
  See application file for complete search history.

(56) References Cited

U.S. PATENT DOCUMENTS

| 4,704,683 | A | * | 11/1987 | Osanai | B60W 10/06 474/12 |
| 5,947,861 | A | * | 9/1999 | Nobumoto | F16H 61/66254 477/37 |
| 8,585,551 | B2 | | 11/2013 | Choby | |
| 8,874,332 | B2 | | 10/2014 | Davis et al. | |
| 2001/0046924 | A1 | * | 11/2001 | Tamura | F16H 61/66254 477/45 |
| 2005/0096822 | A1 | * | 5/2005 | Aoki | F16H 61/66259 701/51 |
| 2007/0015625 | A1 | * | 1/2007 | Wohlrab | F16H 61/66259 477/37 |
| 2015/0152962 | A1 | * | 6/2015 | Ajimoto | F16H 61/6648 477/37 |

(Continued)

FOREIGN PATENT DOCUMENTS

| CN | 104675986 A | 6/2015 |
| JP | H09133208 A | 5/1997 |
| WO | 2005054719 A1 | 6/2005 |

*Primary Examiner* — Jacob S. Scott
*Assistant Examiner* — Timothy Hannon
(74) *Attorney, Agent, or Firm* — Quinn IP Law

(57) ABSTRACT

A powertrain system including an internal combustion engine rotatably coupled to a continuously variable transmission (CVT) is described. A method for controlling the CVT includes determining minimum and maximum CVT input speeds in response to an accelerator pedal position, and monitoring vehicle speed and a CVT input speed. A target CVT input acceleration rate is determined based upon the vehicle speed, and a desired speed ratio is determined that is responsive to the target CVT input acceleration rate. The CVT is controlled based upon the desired speed ratio.

18 Claims, 4 Drawing Sheets

(56) References Cited

U.S. PATENT DOCUMENTS

| | | | | |
|---|---|---|---|---|
| 2015/0183437 | A1* | 7/2015 | Minamisawa | B60W 10/04 701/54 |
| 2016/0068161 | A1* | 3/2016 | Iketomi | B60W 30/188 477/3 |
| 2016/0185353 | A1* | 6/2016 | Honma | B60W 10/04 477/109 |
| 2016/0201798 | A1* | 7/2016 | Kikkawa | F16H 61/662 477/44 |
| 2017/0138473 | A1* | 5/2017 | Fukao | F16H 61/66259 |
| 2017/0217425 | A1* | 8/2017 | Ono | B60W 20/13 |
| 2017/0349180 | A1* | 12/2017 | Honma | B60W 30/182 |

* cited by examiner

US 10,190,684 B2

METHOD AND APPARATUS TO CONTROL A CONTINUOUSLY VARIABLE TRANSMISSION

TECHNICAL FIELD

This disclosure relates to a continuously variable transmission for a vehicle powertrain, and a method and control routine associated therewith.

BACKGROUND

Powertrains having an internal combustion engine coupled to a continuously or infinitely variable transmission (CVT) may be employed to provide tractive effort in vehicles. A CVT is capable of operating at input/output speed ratios that are infinitely variable over a range between a minimum (underdrive) ratio and a maximum (overdrive) ratio, thus permitting selection of engine operation that achieves a preferred balance of fuel consumption and engine performance in response to an operator torque request. The capability of providing infinitely variable input/output speed ratios distinguishes a CVT from a step-gear transmission, which includes a plurality of fixed gear ratios that may be engaged in a stepwise manner in response to an output torque request.

Known chain-type CVTs include two pulleys, each having two sheaves. A chain runs between the two pulleys, with the two sheaves of each of the pulleys sandwiching the chain therebetween. Frictional engagement between the sheaves of each pulley and the chain couples the chain to each of the pulleys to transfer torque from one pulley to the other. One of the pulleys may operate as a drive or input pulley, and the other pulley may operate as a driven or output pulley. The gear ratio is the ratio of the torque of the driven pulley to the torque of the drive pulley. The gear ratio may be changed by urging the two sheaves of one of the pulleys closer together and urging the two sheaves of the other pulley farther apart from each other, causing the chain to ride higher or lower on the respective pulley.

Known toroidal CVTs include discs and roller mechanisms that transmit power between the discs. The toroidal CVT includes at least one input disc, connected to the engine, and one output disc operatively connected to the transmission output. The input disc and output disc define a cavity therebetween. The cavity defines a toroidal surface. The roller mechanism is assembled within the cavity and is configured to vary the torque transmission ratio as the roller mechanism moves across the toroidal surface.

SUMMARY

A powertrain system including an internal combustion engine rotatably coupled to a continuously variable transmission (CVT) is described. A method for controlling the CVT includes determining minimum and maximum CVT input speeds in response to an accelerator pedal position, and monitoring vehicle speed and a CVT input speed. A target CVT input acceleration rate is determined based upon the vehicle speed, and a desired speed ratio is determined that is responsive to the target CVT input acceleration rate. The CVT is controlled based upon the desired speed ratio.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
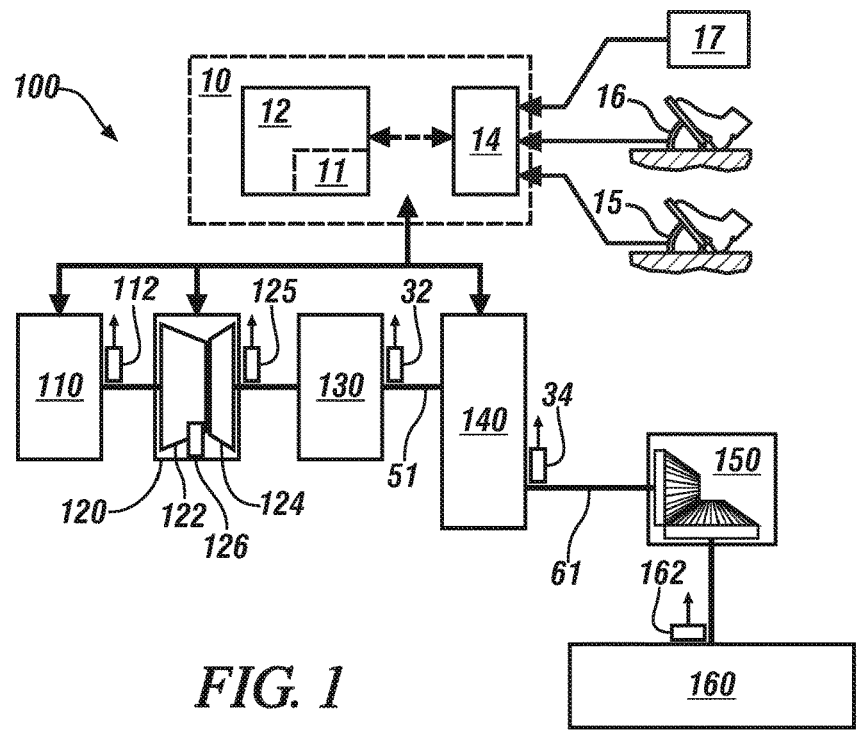
FIG. 1 schematically illustrates elements of a powertrain system that includes an internal combustion engine rotatably coupled to a continuously variable transmission (CVT) via a torque converter and a gear box, in accordance with the disclosure.

Referring now to the drawings, wherein the depictions are for the purpose of illustrating certain exemplary embodiments only and not for the purpose of limiting the same, FIG. 1 schematically illustrates elements of a powertrain system 100 that includes an internal combustion engine (engine) 110 rotatably coupled to a continuously variable transmission (CVT) 140 via a torque converter 120 and a gear box 130. The powertrain system 100 couples via a driveline 150 to a vehicle wheel 160 to provide tractive effort when employed on a vehicle. Operation of the powertrain system 100 is monitored by and controlled by a control system 10 in response to driver commands and other factors.

The engine 110 may be any suitable internal combustion engine capable of transforming hydrocarbon fuel to mechanical power to generate torque in response to commands originating from the control system 10. The torque converter 120 is a device providing fluidic coupling between input and output members for transferring torque, and preferably includes a pump 122 that is coupled to the engine 110, a turbine 124 that is coupled via the output member to the gear box 130 and a torque converter clutch 126 that locks rotation of the pump 122 and turbine 124 and is controllable by the control system 10. The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

The powertrain system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162, through which vehicle speed (Vss) is monitored. Each of the aforementioned speed sensors may be any suitable rotation position/speed sensing device, such as a Hall-effect sensor. Each of the aforementioned speed sensors communicates with the control system 10.

The control system 10 preferably includes one or a plurality of controllers 12 and a user interface 14. A single controller 12 is shown for ease of illustration. The controller 12 may include a plurality of controller devices, wherein each of the controllers 12 is associated with monitoring and controlling a single system. This may include an engine control module (ECM) for controlling the engine 110, and a transmission controller (TCM) for controlling the CVT 140 and monitoring and controlling a single subsystem, e.g., a torque converter clutch. The controller 12 preferably includes a memory device 11 containing executable instruction sets. The user interface 14 communicates with operator input devices including, e.g., an accelerator pedal 15, a brake pedal 16 and a transmission gear selector 17. In one embodiment, the transmission gear selector 17 includes a tap-up/tap-down feature, whereby a vehicle operator may manually select a transmission gear ratio and override transmission control. A tap-up command results in a command to the CVT 140 to increase the gear ratio, which is accomplished by increasing a variator speed ratio. A tap-down command results in a command to the CVT 140 to decrease the gear ratio by decreasing the variator speed ratio.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters, and regularly or periodically updating the states of the parameters during execution of a routine or between iterations of execution of the routine.

Figure 2:
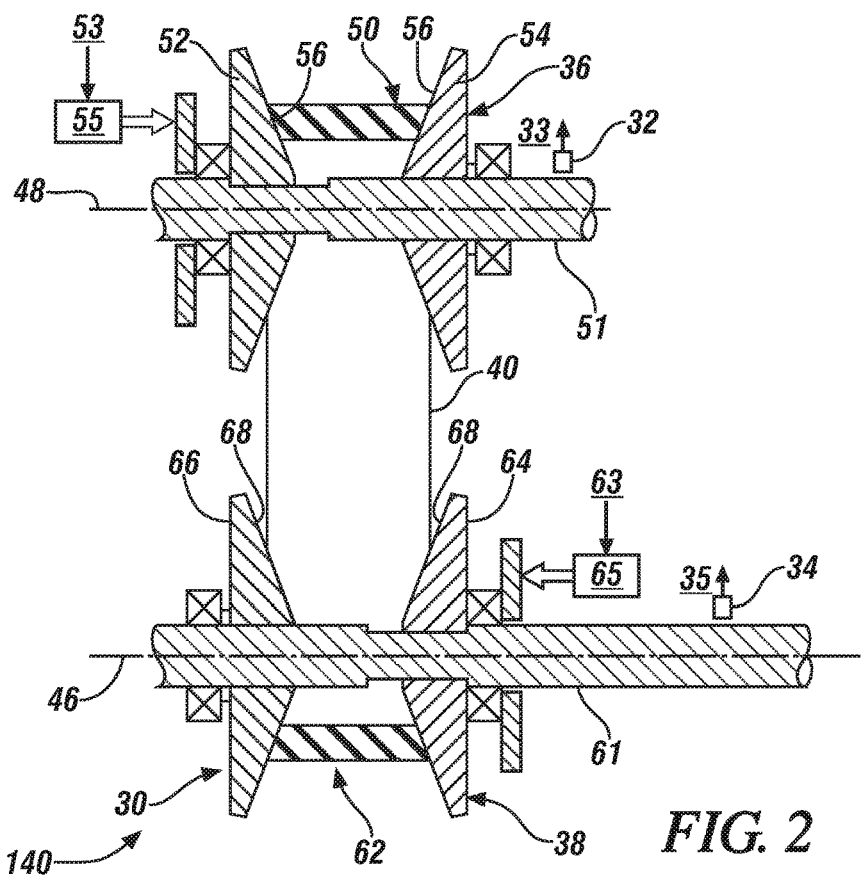
FIG. 2 schematically illustrates elements of a variator of a chain-type CVT, in accordance with the disclosure.

FIG. 2 schematically illustrates elements of a variator 30 of a chain-type continuously variable transmission (CVT) 140 that may be advantageously controlled by the controller 12. The variator 30 transfers torque between the first rotating member 51 and the second rotating member 61. The first rotating member 51 is nominally referred to herein as input member 51, and the second rotating member 61 is nominally referred to herein as output member 61.

The variator 30 includes a first, or primary pulley 36, a second, or secondary pulley 38 and a flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device.

The first pulley 36 is split perpendicular to the first axis 48 to define an annular first groove 50 that is formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48. The stationary first sheave 54 is disposed opposite the moveable first sheave 52. The stationary first sheave 54 is axially fixed to the input member 51 along the first axis 48. As such, the stationary first sheave 54 does not move in the axial direction of the first axis 48. The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first grooved surfaces 56 preferably form an inverted frustoconical shape such that a movement of the moveable first sheave 52 towards the stationary first sheave 54 increases an outer pulley diameter of the annular first groove 50. An actuator 55 is arranged with the first pulley 36 to control an axial position of the moveable first sheave 52 in response to a drive signal 53, including urging the moveable first sheave 52 towards the stationary first sheave 54. In one embodiment, the actuator 55 is a hydraulically-controlled device and the drive signal 53 is a hydraulic pressure signal.

The second pulley 38 is split perpendicular to the second axis 46 to define an annular second groove 62 therebetween. The annular second groove 62 is disposed perpendicular to the second axis 46. The second pulley 38 includes a moveable sheave 64 and a stationary sheave 66. The moveable sheave 64 axially moves or translates along the second axis 46 relative to the stationary sheave 66. For example, the moveable second sheave 64 may be attached to the output member 61 via a splined connection, thereby allowing axial movement of the moveable second sheave 64 along the second axis 46. The stationary second sheave 66 is disposed opposite the moveable second sheave 64. The stationary second sheave 66 is axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the moveable second sheave 64 and the stationary second sheave 66 are disposed opposite each other to define the annular second groove 62 therebetween. The opposed second grooved surfaces 68 preferably form an inverted frustoconical shape such that a movement of the moveable second sheave 64 towards the stationary second sheave 66 increases an outer pulley diameter of the annular second groove 62. An actuator 65 is arranged with the second pulley 38 to control an axial position of the moveable second sheave 64 in response to a driven signal 63, including urging the moveable second sheave 64 towards the stationary second sheave 66. In one embodiment, the actuator 65 is a hydraulically-controlled device and the driven signal 63 is a hydraulic pressure signal. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

Various sensors are suitably positioned for sensing and providing signals related to operation of the CVT 140, including the CVT variator input speed sensor 32 and the CVT variator output speed sensor 34. The input speed sensor 32 may be mounted near the input member 51 to generate an input speed signal 33, and the CVT variator output speed sensor 34 may be mounted near the output member 61 to generate an output speed signal 35.

The variator speed ratio is a ratio of the speed of the input member 51 in relation to the speed of the output member 61. An actual speed ratio indicates a present, measured value for the speed ratio, and may be determined based upon a ratio of the input speed signal 33 and the output speed signal 35. A desired speed ratio indicates a commanded, future value for the speed ratio, which may be determined based upon monitored and estimated operating conditions related to an output power command, vehicle speed, engine torque, and other factors. The controller 12 controls the CVT 140 to achieve the desired speed ratio by controlling pressures of one or both the primary pulley 36 and the secondary pulley 38 of the CVT 140. Controlling pressures of one or both the primary pulley 36 and the secondary pulley 38 of the CVT 140 can be achieved by controlling the drive and driven signals 53, 63 to apply requisite pressures to the first and second actuators 55, 65 to effect the desired speed ratio, wherein the requisite pressures are preferably in the form of a primary pressure command and a secondary pressure command.

Known control routines for operating embodiments of the powertrain system 100 including the engine 110 and the CVT 140 include operating the engine 110 within a speed/load region that provides peak efficiency and controlling the speed ratio of the CVT 140 in response to an output torque request. This may result in the engine speed and associated engine noise remaining within a narrow speed range during vehicle acceleration, which may be not be positively perceived by a vehicle operator under certain circumstances. Instead, as described herein, the engine 110 and the CVT 140 may be controlled by a control routine that simulates operation of an engine coupled to a step-gear transmission in response to an output torque request, including when the output torque request is greater than a minimum threshold.

Figure 3:
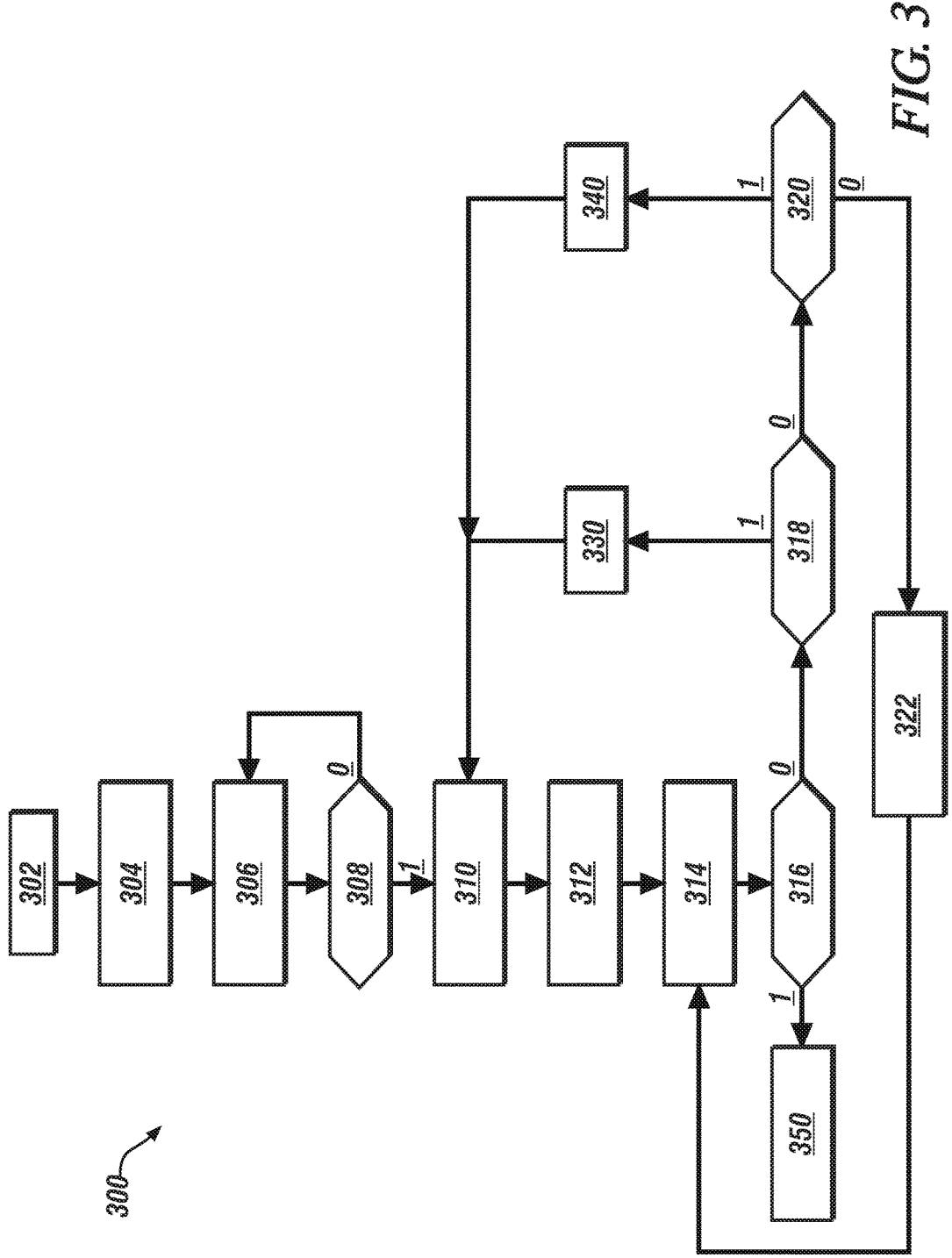
FIG. 3 schematically shows a block diagram of a CVT simulated shift control routine that may be employed in controlling an embodiment of the powertrain system including the CVT shown with reference to FIGS. 1 and 2 in response to an output torque request, in accordance with the disclosure.

FIG. 3 schematically shows a block diagram of a CVT simulated shift control routine (routine) 300 that can be employed in controlling an embodiment of the CVT 140 that is employed in an embodiment of the powertrain system 100 shown with reference to FIGS. 1 and 2 in response to an operator input to an accelerator pedal 15 (APP). Table 1 is provided as a key wherein the numerically labeled blocks and the corresponding functions are set forth as follows, corresponding to the CVT downshift control routine 300.

TABLE 1

| BLOCK | BLOCK CONTENTS |
|---|---|
| 302 | Monitor operator input to accelerator pedal (APP) |
| 304 | Determine minimum and maximum input speeds responsive to APP |
| 306 | Determine previous desired speed ratio |
| 308 | Is input speed greater than an initial target input speed? |
| 310 | Determine a target CVT input acceleration rate |
| 312 | Determine an input speed trajectory |
| 314 | Determine a desired speed ratio step-increase or step-decrease |
| 316 | Is APP less than enable threshold? |
| 318 | Is input speed greater than maximum input speed? |
| 320 | Is input speed less than minimum input speed? |
| 322 | Determine minimum and maximum input speeds at APP |
| 330 | Execute speed ratio step-increase to desired speed ratio for upshift |
| 340 | Execute speed ratio downshift to desired speed ratio for downshift |
| 350 | End |

The CVT simulated shift control routine (routine) 300 is described in terms of a CVT input speed and a CVT output speed, both of which are preferably measured parameters that are input to the controller 12. The CVT input speed and CVT input acceleration refer to rotation of the CVT input member 51, and may be determined based upon a signal input from one of the engine speed sensor 112, the torque converter turbine speed sensor 125, or the CVT variator input speed sensor 32, as described herein, or another suitable rotational speed/position sensor. The CVT output speed and CVT output acceleration refer to rotation of the CVT output member 61, and may be determined based upon a signal input from the CVT variator output speed sensor 34 or the wheel speed sensor 162 as described herein, or another suitable rotational speed/position sensor. The speed ratio, i.e., a ratio of the speed of the input member 51 in relation to the speed of the output member 61, is determined based upon the CVT input speed and the CVT output speed.

During ongoing operation of the powertrain system 100, the controller 12 periodically monitors the operator input to the accelerator pedal 15 (APP), with such input interpreted by the controller 12 as having a state that ranges between 0% and 100%. The APP state indicates an operator request for vehicle acceleration, and is employed by the controller 12 to determine engine and vehicle load. The APP state of APP=0% corresponds to zero operator input to the accelerator pedal 15, i.e., a no-load or idle condition. The APP state of APP=100% corresponds to a maximum operator input to the accelerator pedal 15, i.e., a maximum load condition that may also be referred to as a wide-open-throttle event or WOT. When the APP state exceeds a minimum threshold, e.g., 50% (302), indicating an operator request for rapid vehicle acceleration, the routine 300 determines minimum and maximum CVT input speed thresholds, which are preferably responsive to the present APP state (304). In one embodiment, the minimum and maximum CVT input speed thresholds increase with increased magnitude of the APP state, and decrease with decreased magnitude of the APP state.

The routine 300 monitors the CVT input speed and captures the previous desired speed ratio, which becomes the present speed ratio (306). When the CVT input speed exceeds an initial target input speed (308)(1), the routine 300 proceeds. Otherwise (308)(0), the routine 300 continues to monitor the CVT input speed and capture the previous desired speed ratio. The initial target input speed is a CVT input speed that becomes limited based upon a target CVT input acceleration rate, and is shown graphically with reference to FIG. 4.

When the CVT input speed exceeds the initial target input speed (308)(1), the routine 300 determines the preferred target CVT input acceleration rate (310) and determines an input speed trajectory based upon the target CVT input acceleration rate (312). Examples of target CVT input acceleration rates and input speed trajectories are described and shown graphically with reference to FIG. 4.

A desired speed ratio is determined and communicated to the controller 12 for implementation to control operation of the CVT 140 (314). The desired speed ratio may include a desired speed ratio associated with a step-increase in the speed ratio when commanded by the routine 300 at step 330. The desired speed ratio may include a desired speed ratio associated with a step-decrease in the speed ratio when commanded by the routine 300 at step 340. The desired speed ratio may achieve a change in the CVT input speed that is determined in response to the input speed trajectory. A step-increase in the CVT 140 is analogous to an upshift in a step-gear automatic transmission, and includes controlling the CVT 140 to increase the speed ratio by a magnitude that is functionally equivalent to controlling a step-gear transmission to operate at a higher gear ratio. A step-decrease in the CVT 140 is analogous to a downshift in a step-gear automatic transmission, and includes controlling the CVT 140 to decrease the speed ratio by a magnitude that is functionally equivalent to controlling a step-gear automatic transmission to operate at a lower gear ratio. The desired speed ratios are determined in relation to the present speed ratio, and preferably include a step-increase and a step-decrease in the present speed ratio, respectively. In one embodiment, the magnitude of the step-increase or step-decrease in the present speed ratio is about 8% for each iteration. Alternatively, the magnitude of the step-increase in the present speed ratio may be any suitable value, and may vary with the CVT input speed.

When the present APP state remains greater than the minimum threshold (316)(0), the routine 300 determines whether the CVT input speed has exceeded the maximum CVT input speed threshold (318), and if so (318)(1), the routine 300 commands execution of a step-increase in the present speed ratio to achieve the desired speed ratio (330). This includes selecting a target CVT input acceleration rate based upon the vehicle speed that corresponds to a minimum CVT input speed, after achieving the desired speed ratio, and controlling the CVT to achieve the target CVT input acceleration rate. The routine 300 iteratively executes to determine an updated target CVT input acceleration rate (310), with such operation continuing until there is a change in the APP state or until the CVT 140 has achieved a maximum speed ratio.

When the CVT input speed has not exceeded the maximum CVT input speed threshold (318)(0), the routine 300 determines whether the CVT input speed is less than the minimum CVT input speed threshold (320). When the CVT input speed is greater than the minimum CVT input speed threshold (320)(0), the routine 300 updates the minimum and maximum CVT input speed thresholds that are responsive to the present APP state (322), and determines an updated desired speed ratio based upon the input speed trajectory, which may include adjusting the speed ratio in a continuous manner in response to the input speed trajectory (314). The desired speed ratio may be determined as a ratio of the target engine speed divided by the transmission output speed that may be based upon a signal input from the CVT variator output speed sensor 34.

When the CVT input speed is less than the minimum CVT input speed threshold (320)(1), the routine 300 commands execution of a step-decrease in the present speed ratio (340). The routine 300 iteratively executes to determine the updated target CVT input acceleration rate (310), with such operation continuing until there is a change in the APP state or until the CVT 140 has achieved a maximum speed ratio. When the CVT input speed is less than the maximum CVT input speed threshold (318) and greater than the minimum CVT input speed (320), a speed ratio will be continuously determined in order to maintain the input speed trajectory (314) that was determined when the step-increase or the step-decrease was initiated (312).

Figure 4:
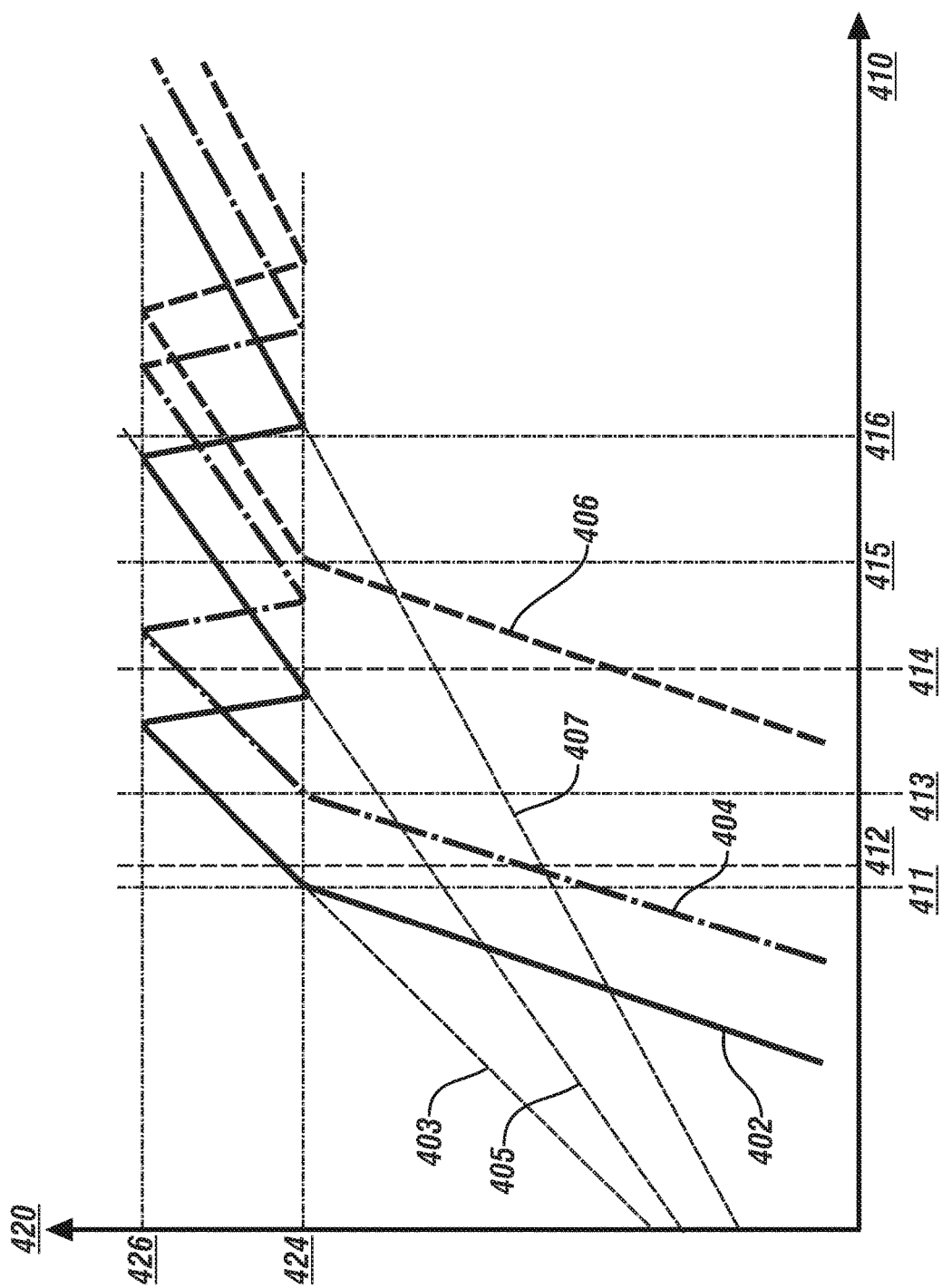
FIG. 4 graphically shows target CVT input acceleration rates and associated CVT input speed trajectories in relation to vehicle speed, in accordance with the disclosure.

FIG. 4 graphically shows a plurality of input speed trajectories 402, 404 and 406, which are determined based upon target CVT input acceleration rates 403, 405 and 407 in relation to vehicle speed (kph) 410, which is shown on the horizontal axis with CVT input speed (RPM) 420 shown on the vertical axis. The vehicle speed 410 has a plurality of pre-defined breakpoints 412, 414 and 416, which separate the vehicle speed 410 into a plurality of speed bins or ranges. One of the target CVT input acceleration rates, e.g., CVT input acceleration rates 403, 405 and 407, is associated with each of the speed bins. The vehicle speeds associated with the breakpoints 412, 414 and 416 are calibratable, and the quantity of breakpoints is also calibratable. In one embodiment, the quantity of speed breakpoints and the corresponding vehicle speeds associated therewith are analogous to those associated with operation and shifting of a step-gear automatic transmission configured with a plurality of discrete steps or gear ratios, e.g., a six-speed transmission, an eight-speed transmission or another step-gear transmission.

Each input speed trajectory, e.g., each of the input speed trajectories 402, 404 and 406, is defined by an initial target CVT input speed 424 and a corresponding vehicle speed, a maximum CVT input speed 426 and a corresponding vehicle speed, a plurality of target CVT input acceleration rates, e.g., CVT input acceleration rates 403, 405 and 407, and a plurality of vehicle speed breakpoints, e.g., the vehicle speed breakpoints 412, 414 and 416. As described herein, the initial target CVT input speed 424 also serves as the minimum CVT input speed.

Referring again to FIG. 3 with continued reference to FIG. 4, each input speed trajectory is determined as follows. When the APP state exceeds a minimum threshold, e.g., 50% (302), indicating an operator request for rapid vehicle acceleration, the variator speed ratio is captured and output (306) until the input speed exceeds the initial target CVT input speed 424. The trajectory calculation determines the target engine speed, which is used to determine a speed ratio command. The target CVT input acceleration rates 403, 405 and 407 in relation to vehicle speed (kph) 410 are defined as follows:

$$Y1 = M1*X1 + B1$$

wherein:
- X1 is the current vehicle speed, kph
- Y1 is the target input speed, rpm
- M1 is a trajectory slope, i.e., the target CVT input acceleration rate, and
- B1 is an engine speed at which the trajectory line crosses the y-axis.

The trajectory slope M1 is binned into ranges that are defined by vehicle velocities, e.g., vehicle speed breakpoints 412, 414 and 416. When a shift is triggered, the trajectory slope M1 is selected based on current vehicle speed, and the routine 300 iteratively executes to determine an updated target CVT input acceleration rate (310). Each time a shift is triggered by exceeding the maximum CVT input speed 426 during an acceleration event or falling below the initial target CVT input speed 424, or when the engine speed first crosses the initial target CVT input speed 424, the trajectory slope M1 is established. Thus, the B1 term is established by Y1−(M1*X1). The target speed Y1 used to calculate B1 can be the current input speed when crossing the initial target CVT input speed 424 for first time during this acceleration period, the minimum threshold speed when the input speed exceeds the maximum CVT input speed 426 during an upshift, or the maximum threshold speed when input speed reduces to less than the initial target CVT input speed 424 during a downshift. Between shifts, e.g., while operating between the minimum and maximum thresholds), Y1, the target speed, is calculated using B1, the y-intercept, and the M1 slope, i.e., the target CVT input acceleration rate.

The initial target CVT input speed 424 is a CVT input speed at which the engine may operate at one of the CVT input acceleration rates, i.e., one of the target CVT input acceleration rates 403, 405 and 407, and corresponds to the minimum CVT input speed threshold that is responsive to the present APP state described with reference to FIG. 3. The maximum CVT input speed 426 corresponds to the maximum CVT input speed threshold that is responsive to the present APP state described with reference to FIG. 3. The maximum CVT input speed 426 may be calibrated based upon an engine speed/torque curve, and thus may be set at a CVT input speed level that is based upon the capability of the engine to generate torque to accelerate the vehicle while the CVT is operating at the present speed ratio without exceeding a maximum CVT input speed. In one embodiment, the maximum CVT input speed 426 may increase with an increase in engine load indicated by the APP state. The initial target CVT input speed 424 may be a speed level that is based upon the magnitude of the step-increase in the present speed ratio to achieve the new desired speed ratio, and may be an approximation in certain embodiments. As described herein, the routine 300 only controls the speed ratio of the CVT 140, and thus the initial target CVT input speed 424 occurs in response to the step-change in the speed ratio of the CVT 140 with the engine operating at the engine load indicated by the APP state.

The target CVT input acceleration rates 403, 405 and 407 are calibratable, and are preferably inversely proportional to vehicle speed to approximate input acceleration at higher gears in a step-gear automatic transmission. Thus, the target CVT input acceleration rate 403 is greater than the target CVT input acceleration rate 405, which is greater than the target CVT input acceleration rate 407. The target CVT input acceleration rates 403, 405 and 407 are preferably based upon a capability of an embodiment of the internal combustion engine 110 to generate torque in conjunction with operation of an embodiment of the powertrain system 100 including the CVT 140 described herein.

The first input speed trajectory 402 includes initial operation at a low CVT input speed state and a low vehicle speed state. The CVT input speed increases to intersect with the first CVT input acceleration rate 403 at the initial target CVT input speed 424, with vehicle speed 411 less than the first breakpoint 412. As such, the first input speed trajectory 402 tracks the first CVT input acceleration rate 403 until the CVT input speed reaches the maximum CVT input speed 426. When the CVT input speed reaches the maximum CVT input speed 426, the routine 300 commands the CVT to execute a step-increase in a present speed ratio to achieve a new desired speed ratio. When the CVT executes the step-increase in the present speed ratio to achieve the new desired speed ratio, the new vehicle speed is greater than the second breakpoint 414, and thus the first input speed trajectory 402 tracks the second CVT input acceleration rate 405 until the CVT input speed reaches the maximum CVT input speed 426. When the CVT input speed again reaches the maximum CVT input speed 426, the routine 300 commands the CVT to execute another step-increase in the present speed ratio to achieve a new desired speed ratio. When the CVT executes the step-increase in the present speed ratio to achieve the new desired speed ratio, the new vehicle speed is greater than the third breakpoint 416, and thus the first input speed trajectory 402 tracks the third CVT input acceleration rate 407 until the CVT input speed reaches the maximum CVT input speed 426, if at all.

A second input speed trajectory 404 is shown, which is initially at a low CVT input speed state and an increased vehicle speed state. The CVT input speed is increasing to intersect with the first CVT input acceleration rate 403 at the initial target CVT input speed 424, with the vehicle speed 413 greater than the first breakpoint 412. As such, the second CVT input speed trajectory 404 tracks the first CVT input acceleration rate 403 until the CVT input speed reaches the maximum CVT input speed 426. When the CVT input speed reaches the maximum CVT input speed 426, the routine 300 commands execution of a step-increase in the present speed ratio to achieve a new desired speed ratio. When the CVT executes the step-increase in the present speed ratio to achieve the new desired speed ratio, the new vehicle speed is greater than the second breakpoint 414, and thus the second CVT input speed trajectory 404 tracks the second CVT input acceleration rate 405 until the CVT input speed reaches the maximum CVT input speed 426. When the CVT input speed again reaches the maximum CVT input speed 426, the routine 300 commands the CVT to execute another step-increase in the present speed ratio to achieve a new desired speed ratio. When the CVT executes the step-increase in the present speed ratio to achieve the new desired speed ratio, the new vehicle speed is greater than the third breakpoint 416, and thus the second input speed trajectory 404 tracks the third CVT input acceleration rate 407 until the CVT input speed reaches the maximum CVT input speed 426, if at all.

A third input speed trajectory 406 is shown, which is initially at a low CVT input speed state and a moderate vehicle speed. The CVT input speed is increasing due to operation of the engine, and intersects with the first CVT input acceleration rate 403 at the initial CVT input speed target 424, with the vehicle speed 415 greater than the second breakpoint 414. As such, the third input speed trajectory 406 tracks the second CVT input acceleration rate 405 until the CVT input speed reaches the maximum CVT input speed 426. When the CVT input speed reaches the maximum CVT input speed 426, the routine 300 commands execution of a step-increase in the present speed ratio to achieve a new desired speed ratio. When the CVT executes the step-increase in the present speed ratio to achieve the new desired speed ratio, the new vehicle speed is greater than the third breakpoint 416, and thus the third input speed trajectory 406 tracks the third CVT input acceleration rate 407 until the CVT input speed reaches the maximum CVT input speed 426, if at all.

Figure 5:
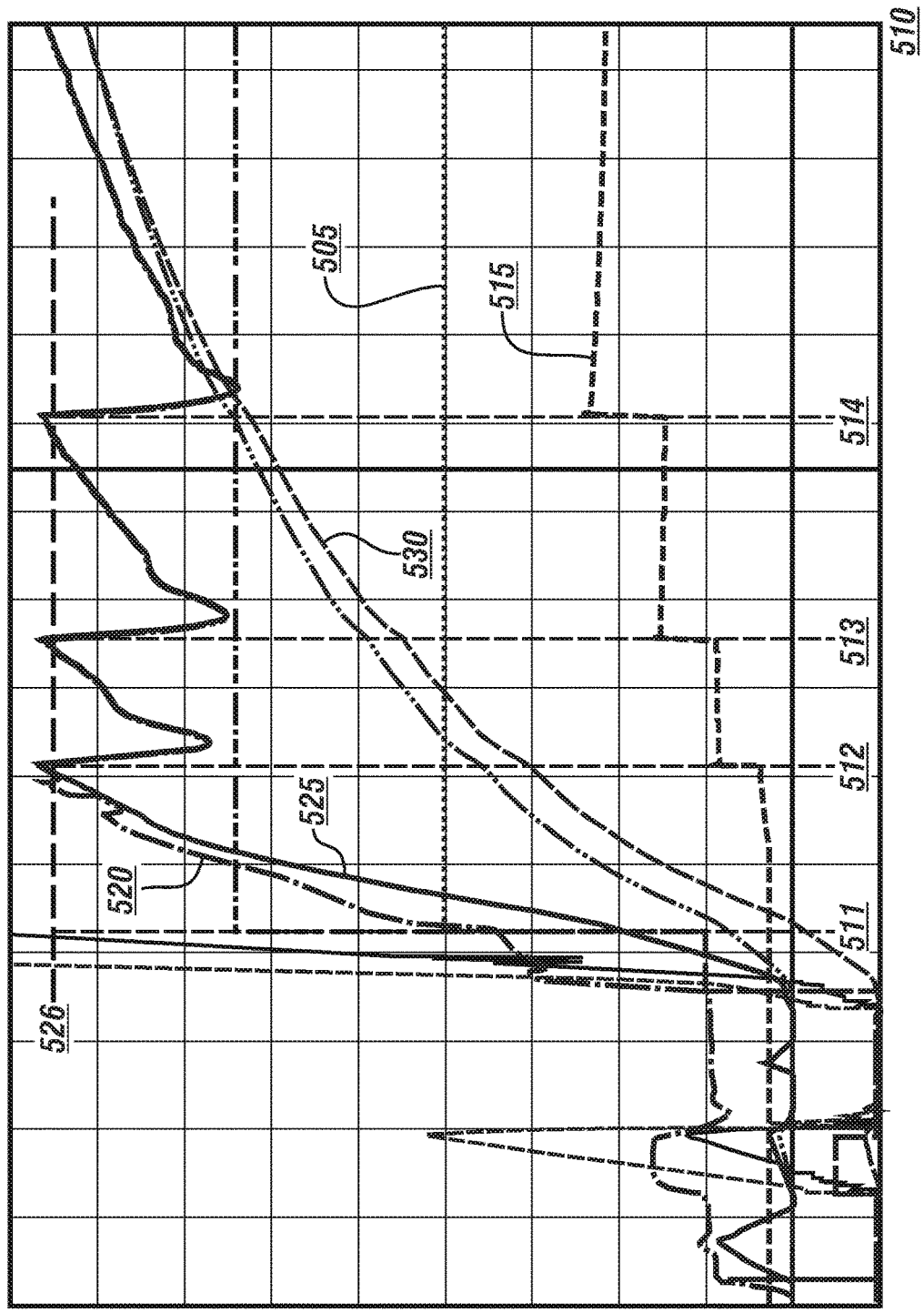
FIG. 5 graphically shows operation of an embodiment of the powertrain system including the CVT described with reference to FIGS. 1 and 2 that is executing an embodiment of the CVT simulated shift control routine described with reference to FIGS. 3 and 4, in accordance with the disclosure.

FIG. 5 graphically shows operation of an embodiment of the powertrain system 100 including the CVT 140 described with reference to FIGS. 1 and 2 that is executing an embodiment of the routine 300 described with reference to FIGS. 3 and 4. States associated with APP state (%) 505, commanded speed ratio 515 for the CVT 140, engine speed (RPM) 520, CVT input speed (RPM) 525 and vehicle speed (kph) 530 are shown on the vertical axis in relation to time (sec) 510 which is shown on the horizontal axis. At timepoint 511, the APP state 505 increases, and exceeds the threshold. The engine speed 520 and CVT input speed 525 increase, with any difference caused by torque converter clutch locking. At timepoint 512, the input speed 520 exceeds a maximum input speed 526, prompting the routine 300 to execute a step-change in the commanded speed ratio 515, with an attendant decrease in the input speed 520. This operation reoccurs at timepoints 513 and 514, with attendant step-changes in the commanded speed ratio 515. As shown, the vehicle speed 530 continually increases. The elapsed times between timepoints 512 and 513 and between timepoint 513 and 514 increases, and corresponds to a decrease in CVT input acceleration at higher vehicle speeds, as shown.

Thus, the routine 300 provides a speed ratio control algorithm that effects simulated shifts in the speed ratio of the CVT 140 that resemble a saw-tooth shape, analogous to gear shifting in a fixed-gear automatic transmission, when an accelerator pedal position is greater than a threshold position. The routine 300 operates with a constant CVT input acceleration that varies depending on vehicle velocity.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instructions to implement the function or act specified in the flowchart.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a continuously variable transmission (CVT) of a powertrain system coupled to a driveline of a vehicle, the method comprising:
   determining minimum and maximum CVT input speeds in response to an accelerator pedal position;
   monitoring vehicle speed and a CVT input speed;
   determining magnitude of vehicle speed at which the monitored CVT input speed achieves the minimum CVT input speed;
   determining a target CVT input acceleration rate based upon the vehicle speed;
   determining an input speed trajectory based upon the target CVT input acceleration rate;
   determining a desired speed ratio based upon the input speed trajectory and the magnitude of vehicle speed at which the monitored CVT input speed achieves the minimum CVT input speed; and
   controlling the CVT based upon the desired speed ratio.

2. The method of claim 1, wherein determining the desired speed ratio further comprises determining a step-increase in the desired speed ratio when the CVT input speed exceeds the maximum CVT input speed.

3. The method of claim 1, wherein determining the desired speed ratio further comprises determining a step-decrease in the desired speed ratio when the CVT input speed is less than the minimum CVT input speed.

4. The method of claim 1, wherein determining the target CVT input acceleration rate based upon the vehicle speed comprises decreasing the target CVT input acceleration rate with an increase in the vehicle speed.

5. The method of claim 1, wherein controlling the CVT based upon the desired speed ratio further comprises controlling a primary pressure command to drive an actuator of a moveable sheave of a primary pulley of a variator of the CVT in response to the desired speed ratio.

6. The method of claim 1, wherein controlling the CVT based upon the desired speed ratio further comprises controlling a secondary pressure command to drive an actuator of a moveable sheave of a secondary pulley of a variator of the CVT in response to the desired speed ratio.

7. The method of claim 1, wherein the determining the minimum CVT input speed in response to the accelerator pedal position comprises determining the minimum CVT input speed in response to the accelerator pedal position achieving a minimum value of 50%.

8. A method for controlling a continuously variable transmission (CVT) of a powertrain system coupled to a driveline of a vehicle, the method comprising:
  determining a maximum CVT input speed in response to an accelerator pedal position;
  monitoring vehicle speed and a CVT input speed;
  determining magnitude of vehicle speed at which the monitored CVT input speed achieves the minimum CVT input speed;
  determining a target CVT input acceleration rate based upon the vehicle speed;
  determining an input speed trajectory based upon the target CVT input acceleration rate;
  determining a desired speed ratio based upon the input speed trajectory and the magnitude of vehicle speed at which the monitored CVT input speed achieves the minimum CVT input speed; and
  controlling the CVT based upon the desired speed ratio.

9. The method of claim 8, further comprising determining an input speed to the CVT; and determining a step-increase in the desired speed ratio when the CVT input speed exceeds the maximum CVT input speed.

10. The method of claim 8, wherein determining the desired speed ratio responsive to the target CVT input acceleration rate comprises determining a step-decrease in the desired speed ratio when the CVT input speed is less than a minimum CVT input speed.

11. The method of claim 8, wherein determining the target CVT input acceleration rate based upon the vehicle speed comprises decreasing the target CVT input acceleration rate with an increase in the vehicle speed.

12. The method of claim 8, wherein controlling the CVT based upon the desired speed ratio further comprises controlling a primary pressure command to drive an actuator of a moveable sheave of a primary pulley of a variator of the CVT in response to the desired speed ratio.

13. The method of claim 8, wherein controlling the CVT based upon the desired speed ratio further comprises controlling a secondary pressure command to drive an actuator of a moveable sheave of a secondary pulley of a variator of the CVT in response to the desired speed ratio.

14. A continuously variable transmission (CVT) for a vehicle, comprising:
  a variator including a primary pulley including an actuator-controlled moveable sheave and a secondary pulley including an actuator-controlled moveable sheave;
  the primary pulley rotatably coupled to an input member couplable to an internal combustion engine and the secondary pulley coupled to a driveline of the vehicle; and
  a controller including an instruction set, the instruction set executable to:
    determine minimum and maximum CVT input speeds in response to an accelerator pedal position,
    monitor vehicle speed and a CVT input speed,
    determine magnitude of vehicle speed at which the monitored CVT input speed achieves the minimum CVT input speed;
    determine a target CVT input acceleration rate based upon the vehicle speed,
    determine an input speed trajectory based upon the target CVT input acceleration rate;
    determine a desired speed ratio based upon the input speed trajectory and the magnitude of vehicle speed at which the monitored CVT input speed achieves the minimum CVT input speed, and
    control the moveable sheaves of the primary and secondary pulleys based upon the desired speed ratio.

15. The CVT of claim 14, wherein the instruction set executable to determine the desired speed ratio responsive to the target CVT input acceleration rate comprises the instruction set executable to step-increase the desired speed ratio when the CVT input speed exceeds the maximum CVT input speed.

16. The CVT of claim 14, wherein the instruction set executable to determine the desired speed ratio responsive to the target CVT input acceleration rate comprises the instruction set executable to execute a step-decrease in the desired speed ratio when the CVT input speed is less than the minimum CVT input speed.

17. The CVT of claim 14, wherein the instruction set executable to control the moveable sheaves of the primary and secondary pulleys based upon the desired speed ratio comprises the instruction set executable to control a primary pressure command to drive an actuator of the moveable sheave of the primary pulley in response to the desired speed ratio.

18. The CVT of claim 14, wherein the instruction set executable to control the moveable sheaves of the primary and secondary pulleys based upon the desired speed ratio comprises the instruction set executable to control a second pressure command to drive an actuator of the moveable sheave of the secondary pulley in response to the desired speed ratio.

* * * * *